E. E. WEMP.
BUSHING.
APPLICATION FILED OCT. 22, 1915.
1,200,060.
Patented Oct. 3, 1916.
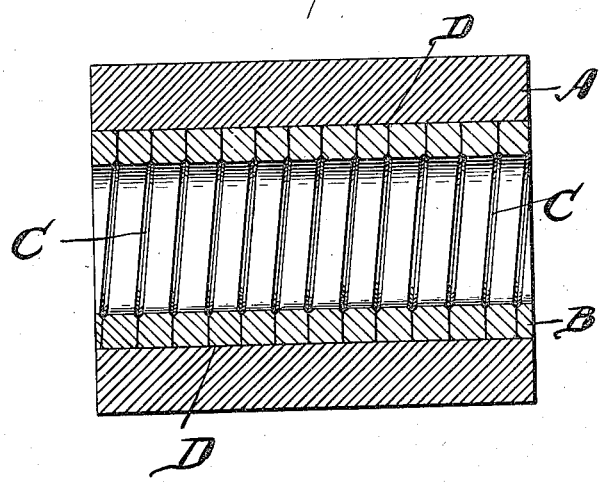
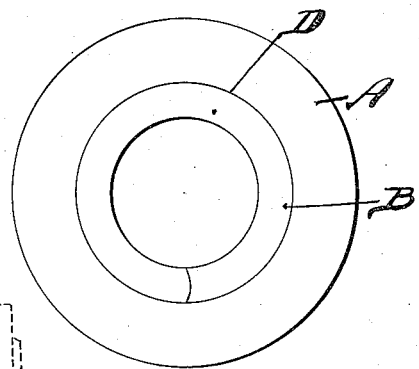
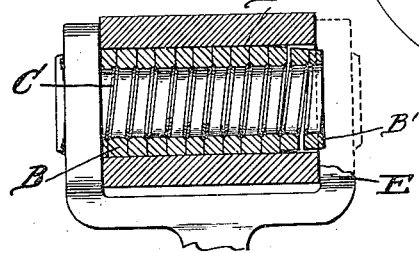

UNITED STATES PATENT OFFICE.

ERNEST E. WEMP, OF PONTIAC, MICHIGAN.

BUSHING.

1,200,060.　　　　　Specification of Letters Patent.　　　Patented Oct. 3, 1916.

Application filed October 22, 1915. Serial No. 57,237.

*To all whom it may concern:*

Be it known that I, ERNEST E. WEMP, citizen of the United States, residing at Pontiac, county of Oakland, State of Michigan, have invented a certain new and useful Improvement in Bushings, and declare the following to be a full, clear, and exact description of the same, such as will enable others skilled in the art to which it pertains to make and use the same, reference being had to the accompanying drawings, which form a part of this specification.

My invention relates to an improvement in bushings for journal bearings, or other analogous purposes, as shown in the accompanying drawings and more particularly pointed out in the following specification and claims.

One of the objects of my invention is to provide a spirally wound element adapted to be forced into the bore of a bearing or other part, the construction being such that an oil conducting channel is provided on the inner face of the bushing adapted to convey a lubricant the entire length of the bushing.

Another feature of the invention consists in forming the spirally wound bushing of an element substantially rectangular in cross-section, the edges of its abutting convolutions being chamfered to form an oil conducting channel its entire length. The outer surface of the bushing may be plain, in order that its entire periphery may impinge upon the surrounding wall of the supporting bearing; the bushing being thus securely held against accidental dislodgment.

Another feature of the invention consists in separating one or more convolutions of the bushing to provide for a longitudinal resilient action of the latter;—the end of the bushing extending temporarily beyond the end of the bearing, to be compressed flush with the bearing upon installing the latter in a supporting yoke or other like element; thus providing against lateral accidental displacement of the bushing.

Figure 1 is a longitudinal central section through the bushing housed within the bore of a bearing. Fig. 2 is an end elevation of the same. Fig. 3 is a longitudinal section of a modification of the bushing housed in a bearing, showing the latter supported in a yoke;—a portion of the yoke being broken away to indicate the projection of the bushing beyond the end of the bearing prior to its compression between the tines of the yoke.

Referring now to the letters of reference placed upon the drawings A, denotes a supporting wall or bearing.

B, indicates a bushing consisting of a spirally wound wire element, substantially rectangular in cross-section, its inner edge being chamfered to form an oil conducting channel C, through coöperation with the chamfered edge of the adjacent convolutions of the bushing. The outer periphery D, of the bushing presents a smooth, plain surface throughout, impinging the wall of the bearing, that it may be secured against accidental displacement.

In the modification shown in Fig. 3, the outer diameter of the bushing at one end is slightly reduced and one or more of the convolutions spread apart to provide a longitudinal resilient action;—the resilient end B', of the bushing extending beyond the end of the bearing. Upon installing the bearing in a yoke E, or analogous supporting element for example, the bushing will be compressed flush with the end of the bearing and is thereby secured against accidental longitudinal displacement.

The spirally wound bushing may be constructed of any desired length or diameter, and cut to fit the requirement of the particular bearing, or location in which it is installed.

Having thus described my invention, what I claim is:—

1. In a device of the character described, a supporting element provided with a bore to receive a bushing, and the bushing comprising a spirally wound element having a smooth periphery throughout, fitted into the bore of said supporting element, said spirally wound element formed with chamfered edges on its inner surface, whereby adjacent convolutions of the element coöperate to form a spiral oil conducting channel.

2. In a device of the character described, a bearing having a bore to receive a bushing, and the bushing comprising a spirally wound element fitted in said bore, having a resilient action at one end that it may extend beyond the end of the bearing, and supporting means for the bearing adapted to compress the projecting end of the bushing, whereby the latter is secured against longitudinal displacement.

3. In a device of the character described, a bearing having a bore adapted to receive a bushing, and the bushing comprising a spirally wound element fitted into the bore of the bearing and provided with chamfered edges on its inner surface to form an oil conducting channel throughout its length, one end of which yieldingly extends beyond the end of the bearing, and means for supporting the bearing adapted to compress the end of the bushing, whereby the latter may be secured against longitudinal displacement.

4. In a device of the character described, a bearing having a bore adapted to receive a bushing, and the bushing fitted into said bore, comprising a spirally wound element, the outer diameter of which is relatively smaller at one end with the end convolutions spread apart to afford longitudinal resiliency, whereby it may yieldingly extend beyond the end of the bearing, the inner face of said spirally wound element formed with an oil conducting channel throughout its length and means for supporting the bearing adapted to compress the yieldable end of the bushing, whereby it may be secured against accidental displacement.

In testimony whereof, I sign this specification in the presence of two witnesses.

ERNEST E. WEMP.

Witnesses:
O. F. BECK,
S. E. THOMAS.